(12) United States Patent
Muller et al.

(10) Patent No.: US 9,487,647 B2
(45) Date of Patent: Nov. 8, 2016

(54) LOW VISCOSITY POLYMER MIXTURE

(75) Inventors: Rolf Muller, Zurich (CH); Federico Innerebner, Zurich (CH)

(73) Assignee: INNOGEL AG, Huenenberg (CH)

( * ) Notice: Subject to any disclaimer, the term of this patent is extended or adjusted under 35 U.S.C. 154(b) by 876 days.

(21) Appl. No.: 12/532,586

(22) PCT Filed: Mar. 20, 2008

(86) PCT No.: PCT/CH2008/000121
§ 371 (c)(1),
(2), (4) Date: Jun. 22, 2010

(87) PCT Pub. No.: WO2008/116334
PCT Pub. Date: Oct. 2, 2008

(65) Prior Publication Data
US 2010/0261835 A1    Oct. 14, 2010

(30) Foreign Application Priority Data

Mar. 23, 2007  (DE) .................. 10 2007 014 620

(51) Int. Cl.
| | | |
|---|---|---|
| C08L 23/00 | (2006.01) | |
| C08L 23/02 | (2006.01) | |
| C08L 23/04 | (2006.01) | |
| C08L 23/16 | (2006.01) | |

(52) U.S. Cl.
CPC .............. *C08L 23/02* (2013.01); *C08L 23/04* (2013.01); *C08L 23/16* (2013.01); *C08L 2205/02* (2013.01)

(58) Field of Classification Search
CPC ........................................ C08L 23/02
USPC ........................................ 525/240
See application file for complete search history.

(56) References Cited

U.S. PATENT DOCUMENTS

| | | | | |
|---|---|---|---|---|
| 4,479,989 A | * | 10/1984 | Mahal | ............. 428/35.5 |
| 4,509,821 A | * | 4/1985 | Stenger | ............... 385/101 |
| 4,703,078 A | * | 10/1987 | Maehara et al. | ............... 524/476 |
| 4,880,843 A | * | 11/1989 | Stein | ................ 521/98 |
| 5,110,685 A | | 5/1992 | Cross et al. | |
| 5,219,903 A | | 6/1993 | Fujii et al. | |
| 7,192,909 B2 | | 3/2007 | Richter et al. | |
| 2002/0041972 A1 | | 4/2002 | Nakamura et al. | |
| 2002/0198121 A1 | | 12/2002 | Nitzsche | |
| 2003/0069346 A1 | * | 4/2003 | Borsinger et al. | ............. 524/487 |
| 2005/0137342 A1 | | 6/2005 | Krishnaswamy et al. | |
| 2006/0148960 A1 | * | 7/2006 | Muller et al. | ................ 524/487 |
| 2008/0085971 A1 | * | 4/2008 | Muller et al. | ................ 524/488 |

FOREIGN PATENT DOCUMENTS

| | | | |
|---|---|---|---|
| WO | 2006/042433 | | 4/2006 |
| WO | WO 2006/042433 | * | 4/2006 |

OTHER PUBLICATIONS

POLYWAX flyer, 2011.*
POLIMAXX PE wax flyer, 2013.*
Taiwanese Search Report for Patent Application No. 097132618 dated Jan. 24, 2014.
Clariant, D7—Data Sheet—1 page.
International Plastics Handbook, Data Sheet D8, 2.1 Polymer Structure, 2012.
International Plastics Handbook, Data Sheet, Materials Science of Polymers, p. 22, 2012.
EP claims that are the subject of the notice of opposition for European Application No. 08714771.6-1301/2129719, 2008.

* cited by examiner

*Primary Examiner* — Irina Krylova
(74) *Attorney, Agent, or Firm* — K&L Gates LLP (57) ABSTRACT

The present invention relates to a polymer mixture with a low viscosity, allowing processes for the processing of plastics materials to be accelerated while the final properties of the end products remain the same or are improved. The polymer mixture is mixed with the plastics materials in the manner of an additive. The invention further relates to the production of suitable polymer mixtures of this type and to the use thereof.

18 Claims, 1 Drawing Sheet

LOW VISCOSITY POLYMER MIXTURE

The present invention relates to a polymer mixture with a low viscosity, allowing processes for the processing of plastics materials to be accelerated in such a way that the final properties of the plastics material product are not adversely affected but can, on the contrary, even be improved. The polymer mixture is mixed into the plastics materials in the manner of an additive. The invention further relates to the production of suitable polymer mixtures of this type and to the use thereof in the plastics materials industry.

BRIEF DESCRIPTION OF THE INVENTION

In most cases, thermoplastic polymers are processed using a high-viscosity melt. Various additives known as lubricants are used to make this melt easier to process. Fatty acid derivatives, such as fatty acid esters or fatty acid amides (for example Erucamide, Loxamide OP), metal soaps such as calcium stearate or glycerine monostearate (for example Loxiol GMS 95), or montan wax (for example Hostalub WE 40) have long been in use. They improve the process as lubricants, but they are unstable in the polymer matrix, are rarely homogeneously distributed, and migrate to the surface leading to undesirable surface effects. Fluoropolymers and silicones behave similarly, it being possible to achieve an improvement as regards migration with the ultra high molecular weight silicones of Dow Corning. However, these silicones are expensive and form a separate phase. A list of lubricants is found for example in "Functional Additives for the Plastics Industry", by P. Dufton, Rapra Industry Analysis Report Series, 1998. Polypropylene waxes, as well as polyethylene waxes and Fischer-Tropsch waxes, are also used as additives to improve processes, but, in particular with higher proportions of these waxes, sufficiently homogeneous mixing with the polymer to be processed is not achieved, leading to defects in the end products, and therefore it has not yet been possible to exploit the potential of these waxes. The difficulty of mixing waxes of this type with polymers is due to the fact that the viscosities of the two polymers differ by several orders of magnitude. The greater the difference in viscosities and the higher the proportion of the low viscosity component, the more difficult it is to homogenise components of different viscosities. Because the effect in terms of process acceleration becomes greater as the viscosity of the wax decreases and as the proportion of the wax increases, there are particularly high requirements on the mixing machinery. A suitable PE wax has a viscosity of 10 mPas at 140° C., for example, whilst a typical injection moulding PE has a viscosity in the range of 10,000-100,000 mPas at 140° C. The difference in the viscosities is therefore 3 to 4 orders of magnitude. Typical processing extruders do have a mixing function which is sufficiently good to disperse master batches, but in must cases it is not sufficiently good to homogenise more than 1 to 2% of wax in a polymer melt, and this results in inhomogeneities which lead to defects in the end product.

The invention solves the described problem in that on the one hand, short-chain polymers P2 are used which are compatible with the long-chain polymer P0 to be processed and on the other hand, a premix of polymer P2 and a long-chain polymer P1 with a high proportion of the short-chain polymer P2 is used, polymer P1 being miscible in and in particular at least partially compatible with polymer P0. Two polymers are compatible if at least a part of one polymer crystallises with the same crystal structure as at least a part of the other polymer or if the two polymers are at least partially miscible. The short-chain polymers P2 are fixed in the end product by the crystallites and cannot migrate; they are incorporated into the partially crystalline network of polymer P1 and actually contribute to an increased modulus of elasticity in the end product by way of an increased crystalline content in the end product. A suitable process allowing homogeneous mixing of polymers with very different viscosities can be used for premixing polymer P1 and P2, as this process is isolated from the processing of P0. The premix or additive then has a substantially higher viscosity than P2 by virtue of the proportion of P1, and can also be homogenised together with other polymer melts without difficulty using typical processing extruders, even in relatively large proportions of up to 10%.

DETAILED DESCRIPTION OF THE INVENTION

The invention provides an additive in the form of a polymer mixture which comprises a long-chain polymer P1 and a short-chain polymer P2, this additive being mixed, in the form of a powder or granulate, into a polymer P0 or a polymer mixture M0 containing P0, in such a way that the processing of P0 or M0 can be optimised, in particular accelerated, by virtue of the additive, the final properties of the plastics material product not being adversely affected but actually being improved. Using the additive, short-chain polymers which are difficult to homogenise with long-chain polymers can be exploited simply, to the maximum degree and without any disadvantages in various polymer processing processes. The short-chain polymers are effective because the very low viscosities thereof mean that they reduce the high viscosity of polymer melts, resulting in various process improvements. For example, in injection moulding, cycle times can typically be reduced by 30%. In the following, the additive according to the invention and the production and use thereof will be described.

The additive comprises a long-chain polymer P1 and a short-chain polymer P2, the short-chain polymer P2 comprising at least one block of identical monomers and the long-chain polymer P1 comprising at least one block of similar or greater length of the same monomers. Under these conditions, it is possible for the short-chain polymer P2 to be compatible with the long-chain polymer P1, i.e. a crystallite can comprise blocks of P2 as well as of P1.

The long-chain polymer P1 in this case should not simply be seen as a carrier for the short-chain polymer P2 and the additive therefore should not be seen as a master batch. On the one hand, P1 is required so that P2 can be homogenised with P0 in a simple manner in the various polymer processing processes, and on the other hand, it has been found that the final properties of P0+P1+P2 are often better than those of P0+P2, even if P2 has been fully homogenised with P0. Thus, P1 is of significance both for the process and for the end product, it being possible to obtain targeted modifications to the final properties with a targeted selection of P1.

Long-Chain Polymer P1

As well as being compatible with the short-chain polymer P2, the long-chain polymer P1 must be of a sufficiently high viscosity that a substantially higher viscosity than that of P1 can be obtained in the mixture with P2.

The weight average molecular weight Mw of P1 is >20,000 g/mol. In a preferred embodiment, this molecular weight is >30,000, preferably >50,000, more preferably >70,000, most preferably >90,000. The upper limit on the molecular weight Mw of polymer P1 is determined by the plasticisability and is <6,000,000. In a preferred embodiment, this limit is <5,000,000, more preferably <4,000,000, most preferably <3,000,000.

The number average molecular weight Mn of P1 is >20,000 g/mol. In a preferred embodiment, this molecular weight is >30,000, preferably >40,000, more preferably >50,000, most preferably >70,000.

However, characterisation by the MFI instead of the molecular weight is more appropriate for practical purposes, since this is easier to measure. The MFI of P1 measured at standard temperature in g/10 min at 2.16 kg is <100, preferably <50, more preferably <30, most preferably <15. The lower limit on the MFI of P1 is >0.01, preferably >0.1, more preferably >0.3, most preferably >1. The standard temperature for PE and PP is 190° C. For other polymers, the temperature is approximately 20-40° C. above the typical melting point for the polymer.

With a higher molecular weight and lower MFI of P1, a smaller amount thereof is required in the mixture with P2 to achieve a sufficient viscosity; the additive is then more concentrated based on P2 and less additive needs to be used for a particular process optimisation, i.e. the additive is then more cost-effective. On the other hand, the higher the molecular weight and the lower the MFI of P1, the more difficult and expensive it is to produce the additive, because the difference in viscosity of P1 and P2 is increased.

In principle, the polymer P1 may be any polymer. It could for example be selected from the following group: polyolefins, in particular polyolefins of monomers with 2 to 10 C atoms, PE, in particular UHMWPE, HMWPE, HDPE, LDPE, LLDPE, VLDPE, PP, in particular isotactic PP, syndiotactic PP, atactic PP, PE-PP copolymers, PE copolymers, PP-PE copolymers, PP copolymers, PVA, PVC, PC, PA, PU, ABS, PS, SAN, POM, CA, PMMA, PPE, PPS, PSO, PTFE, PET, PBT. Based on the size of the market, the polyolefins, in particular PE and PP, are the most significant group of substances. P1 may also be a mixture of different types of plastics materials from the same class, for example different PE types or different PP types. Furthermore, the copolymers derived from the aforementioned classes and types of plastics materials (with a proportion of a second type of monomer) and terpolymers (with a proportion of a second and third type of monomer) and higher copolymers (with more than 3 monomer types) are possible, it being possible for the additional monomers to be arranged randomly and/or in block form.

In a preferred embodiment, the proportion of the additional monomers in copolymers is <40, preferably <20, more preferably <10, most preferably <5% by weight, if a polymer which is compatible with the predominant monomers of P1, and which has a copolymer proportion of <20, preferably <15, more preferably <10, most preferably <5% by weight is used for the polymer P2, the monomers of the copolymer portion of polymer P1 and P2 not having to be identical but preferably being identical.

In a preferred embodiment, if the additional monomers are also olefinic, for example PP-PE and PE-PP copolymers, then the proportion of these additional monomers in polyolefins is <50, preferably <30, more preferably <20, most preferably <10% by weight, if a polymer which is compatible with the predominant monomers of P1, and which has a copolymer proportion of <20, preferably <15, more preferably <10, most preferably <5% by weight is used for the polymer P2, the monomers of the copolymer portion of polymer P1 and P2 not having to be identical but preferably being identical.

In a preferred embodiment, the polymer P1 is at least partially crystalline. The crystalline content is >3, preferably >5, more preferably >7, most preferably >10% by weight, the crystalline content being determined by density measurement in accordance with the prior art.

Short-Chain Polymer P2

The viscosity of the short-chain polymer P2 is <10,000 mPas. In a preferred embodiment, this viscosity is <5,000, preferably <3,000, preferably <1,000, preferably <500, preferably <200, more preferably <160, most preferably <100. The lower this viscosity, the greater the effect in terms of the improvement in the flow properties. Therefore, the viscosity of the polymer P2 may also be substantially less than 100 mPas, for example 50 or 10 mPas. The lower limit on the viscosity of P2, if P1 is a partially crystalline polymer and P1 and P2 can crystallise together, is >0.1, preferably >0.5, more preferably >1, most preferably >2 mPas. The reason for this lower limit is that if P2 has too low a viscosity, i.e. too low a molecular weight, then the final properties of the end product can be adversely affected.

The viscosity of P2 is measured at a temperature of approximately 10° C. above the melting point of the associated long-chain polymer P1. This temperature is 140-150° C. for short-chain PE and 170-180° C. for short-chain PP.

If P1 is not partially crystalline and no crystallisation of P1 and P2 together is possible, then the lower limit for the viscosity of P2 in mPas is >1, preferably >3, more preferably >6, most preferably >10, because the polymers P2 become heavier and migrate less as the viscosity increases.

In a preferred embodiment, the polymer P2 is predominantly linear, preferably completely linear, and comprises at least one block of >10, preferably >14, more preferably >17, most preferably >20 identical monomer units M2. In most cases, P2 consists exclusively of monomer units M2. The definition of monomer units is generally clear. For PE, a unit with 2 C atoms is understood to be a monomer unit, both for short-chain and for long-chain PE.

In linear polymers P2, the viscosity increases with Mw, the weight-average molecular weight, as expected. However, the viscosity of branched, in particular highly branched polymers is of a considerably lower value than for linear polymers of the same Mw. Thus, for example, the hyperbranched polyethylene VY BAR 825 of Baker Petrolight with Mw=4760 has a viscosity of approximately 18 mPas at 140° C., whilst a linear polyethylene with the same Mw has a viscosity of approximately 300 mPas.

Therefore, in another preferred embodiment the polymer P2 has a branched, in particular hyperbranched structure, most preferably a spheroid shape. With comparatively heavy polymers P2, which do not migrate or only migrate a little and can have a positive effect on the toughness, it is then possible to achieve a low melt viscosity.

In a preferred embodiment, the molecular weight distribution of polymer P2 has a polydispersity PD=Mw/Mn of <10, preferably <5, more preferably <3, most preferably <2. As the polydispersity decreases, better results are achieved in terms of process acceleration and the final properties. Therefore, monodisperse or substantially monodisperse distributions with PD close to 1 are particularly advantageous. Very good results were obtained with short-chain PE with a PD of approximately 1.1.

In a preferred embodiment, the vapour pressure of polymer P2 at 250° C. is <100, preferably <30, preferably <10, preferably <1, more preferably <0.1, most preferably <0.01 mbar. This ensures that when working up and processing melts containing polymer P2, a vacuum can be applied without the polymer P2 being drawn off from the melt.

The short-chain polymer P2 can in principle be any polymer and is for example selected from the following group of short-chain polymers: short-chain PE, PE copolymers, PE-PP copolymers, PP, PP copolymers, PP-PE copolymers, PVA, PVC, PC, PA, PU, ABS, PS, SAN, POM, CA, PMMA, PPE, PPS, PSO, PTFE, PET, PBT.

These are produced for example from the corresponding long-chain polymers by degradation (for example thermally or with a metal catalyst), or synthesised in short-chain form at the outset, various polymerisation systems being available for this in the prior art. Short-chain polymers P2 may also be mixtures of various types of P2 from the same class of plastics materials, for example different types of PE waxes.

There is a wide selection of short-chain PE on the market, and they may for example be selected from the following group: n-alkanes $C_nH_{2n+2}$; isoalkanes $C_n$; cyclic alkanes $C_nH_{2n}$; polyethylene waxes, paraffins and paraffin waxes of mineral origin such as macrocrystalline, intermediate or microcrystalline paraffins, brittle, ductile, resilient or plastic microcrystalline paraffins; paraffins and paraffin waxes of synthetic origin. PE waxes, Fischer-Tropsch waxes and hyperbranched polyolefins are preferred.

Preferred PE and PP waxes are obtained by synthesis by polymerisation, for example by Ziegler Natta Polymerisation, Philipps polymerisation (chromium oxide catalysts), radical polymerisation or metallozene polymerisation, the metallozene polymerisation being particularly preferred.

Mixtures of the Polymers P1 and P2

To enable the advantageous effects of the short-chain polymer on the processing properties and the final properties, polymers P1 and P2 must be compatible. In this case, compatibility means that P1 has at least one block with >10 monomer units M1 and P2 has at least one block with >10 monomer units M2 where M1 is identical to M2. If P1 is a partially crystalline polymer, compatibility between P1 and P2 means that the two polymers can crystallise together. If the polymers P2 are integrated into crystallites with P1, they are prevented from migrating and can make a useful contribution to the mechanical properties. If P2 is in the form of highly branched and hyperbranched or spheroid short-chain polymers, then crystallisation of P1 and P2 together is not actually necessary for compatibility, and the migration is prevented by a higher molecular weight of the spheroid polymers. If polymer P1 is completely or mainly amorphous, then a P2 with a higher molecular weight may optionally also be used in order to prevent the migration. The compatibility condition still allows for good miscibility of P1 and P2 in this case.

Figure 1:
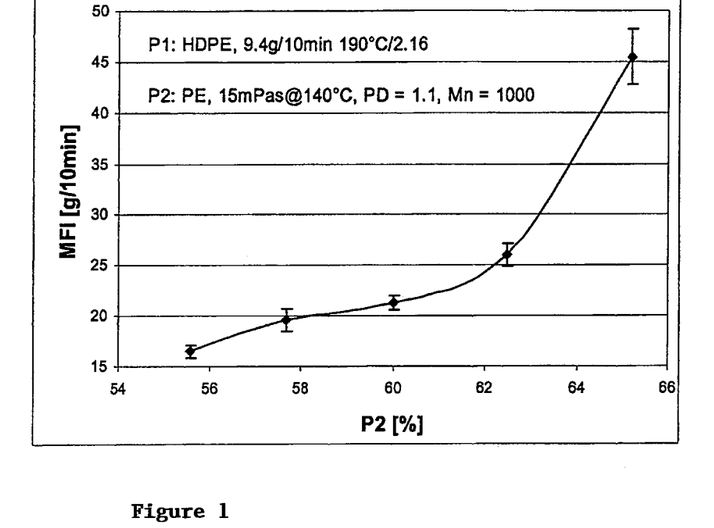
FIG. 1 shows the melt flow index (MFI) of mixtures of the long-chain polymer P1 and the short-chain polymer P2 as a function of the proportion of P2.

FIG. 1 shows the melt flow index (MFI) at 140° C. and 1.2 kg of mixtures of the long-chain polymer P1 and the short-chain polymer P2 as a function of the proportion of P2. For the additive consisting of P1 and P2, as high a proportion as possible of P2 should be combined with as high a viscosity as possible of the mixture of P1 and P2 to make the additive as effective as possible in terms of process acceleration and easy to work into the polymer P0 to be processed. The MFI varies approximately in inverse proportion to the viscosity. The maximum possible viscosity for the highest possible proportion of P2 therefore corresponds to the lowest possible MFI for the highest possible proportion of P2. It is clear from FIG. 1 that there is a steep increase in the MFI above P2=62%. Therefore, the optimum in terms of the object set lies in this range for P2. Below 62%, the MFI and viscosity of the mixture of P1 and P2 are in the range of those of P1, whilst above this point the MFI and viscosity of this mixture approach the corresponding values of P2.

The transition between the two ranges happens at a proportion of P2 of 62% in the example of FIG. 1. If a P1 with a lower MFI is used, then the optimum proportion of P2 is shifted to higher values and vice versa. Moreover, it should be noted that not only is the optimum proportion determined by this behaviour, but also the parameters for the processing of P1 and P2 set particular conditions, for example the homogenisation of P1 and P2 becomes more difficult as the MFI of P1 decreases, in particular if this is to take place with economically acceptable throughputs.

The proportion of polymer P2, based on polymer P2 and polymer P1, is generally >40, preferably >43, more preferably >45, most preferably >48% by weight and <85, preferably <83, more preferably <81, most preferably <78% by weight.

In a preferred embodiment, the upper limit for this proportion is <H, preferably <G, more preferably <F, most preferably <E.

In a preferred embodiment, the lower limit for this proportion is >A, preferably >B, more preferably >C, most preferably >D.

The values of A to H depend on the MFI of the polymer P1 and are given for a wide range of MFIs in Table 1. The values of the limits for MFIs not given are obtained by linear interpolation or extrapolation.

TABLE 1

| MFI of P1 [g/10 min] | A | B | C | D | E | F | G | H |
|---|---|---|---|---|---|---|---|---|
| 0.1 | 48 | 53 | 56 | 59 | 78 | 81 | 83 | 85 |
| 1 | 45 | 49 | 53 | 57 | 74 | 78 | 82 | 85 |
| 10 | 40 | 45 | 50 | 55 | 70 | 75 | 80 | 85 |
| 20 | 40 | 44 | 48 | 54 | 69 | 74 | 79 | 83 |
| 50 | 40 | 43 | 47 | 53 | 68 | 73 | 78 | 80 |

The MFI of the additive is a decisive factor for simple homogenisation of the additive in the polymer melt to be processed. Because the MFI of the additive is too thinly liquid to allow a sensible measurement at 190° C. and 2.16 kg, in the usual conditions for polyolefins, the MFI of the additive is measured at approximately 10° C. above the melting point, at 140° C. for PE and at 170° C. for PP, and at a reduced weight of 1.2 kg. Under these conditions, the MFI of the additive is in the range of 0.5 to 400 g/10 min.

In a preferred embodiment, the lower limit for the MFI of the additive is >1, preferably >2, more preferably >4, most preferably >8 g/10 min.

In a preferred embodiment, the upper limit for the MFI of the additive is <300, preferably <200, more preferably <100, most preferably <60 g/10 min.

The specified range of 0.5 to 400 g/10 min must be considered in relation to the MFI of the short-chain polymer P2. Although this MFI cannot be measured experimentally because of the low viscosity of P2, extrapolation of the relationship between molecular weight and MFI for PE of average molecular weight results in an MFI for a typical P2 in the region of approximately 20,000 g/10 min at 190° C. and 2.16 kg. The MFI range from 0.5 to 400 g/10 min corresponds to polyethylenes with an average molecular weight Mw in the range of 60,000 to 150,000, and this is typical for polyethylenes of average molecular weight. By being combined with P1, the short-chain polymer P2 was thus in effect "converted into a polymer of average molecular weight". When considering the viscosity, the difference is even greater. A typical value for the viscosity of P2 is 10 mPas, whilst a typical value for the viscosity of the additive is approximately 10,000 mPas. This makes it clear that the viscosity of the additive could be higher than the viscosity of P2 by a factor of approximately 1000 in order to enable simple and complete homogenisation of the additive in a polymer melt.

In a preferred embodiment, the difference in the crystallisation temperatures of polymer P1 and polymer P2 is <37° C., these crystallisation temperatures being measured as onset temperatures by DSC at a cooling rate of 20° C./min. In a preferred embodiment, this difference in the crystallisation temperatures is <30, preferably <20, more preferably <15, most preferably <10° C. Also, the crystallisation temperature of P1 is preferably greater than the crystallisation temperature of P2.

This condition ensures that P1 and P2 crystallise together at least in part, and these two components in the mixture of P1 and P2 melt simultaneously at least in part when the additive is used, meaning that this melt then has the required increased viscosity by comparison with P2 and this allows efficient homogenisation. If the condition is not met, then the component P2 of the additive melts prematurely, resulting in problems similar to those occurring when P2 is used on its own, i.e. heterogeneity in the end product.

If has been found that the melting point of the additive, measured as a DSC peak temperature (if multiple melting peaks occur, it is the highest-temperature melting peak that is relevant) at a heating rate of 20° C./min, is of significance.

In a preferred application, this melting point of the additive is <7, preferably <5, more preferably <3, most preferably <2° C. higher than the (highest) melting point of P1 or >0, preferably >3, more preferably >5, most preferably >7° C. lower than the (highest) melting point of P1. This facilitates the melting of the additive in the application.

Because the additive has a very high crystallinity, it is very hard and is therefore predominantly heated and melted by heat transfer, rather than by the introduction of mechanical energy, during the plasticisation together with the polymer P0. If the melting point is too high, then the plasticisation is made more difficult and it is possible that additive particles which have not yet melted may be present in the melt of polymer P0, so that the desired effect of the additive does not occur or occurs only after increased plasticisation, making the process slower and more energy-consuming when the object is to do the opposite. Table 2 shows examples of the effect of the melting point Tm of the additive on the melting point of P2, it being possible for the melting point of the additive to be reduced by up to 15° C. by comparison with P1. In the case of use in the plasticisation of a polymer P0, an additional acceleration is obtained by having as low a melting point as possible for the additive in that the plasticisation energy and time are reduced.

TABLE 2

| Tm of P2 ° C. | Tm of P1 ° C. | Tm of P1 + P2 with 60% P2 ° C. |
|---|---|---|
| 130 | 140 | 140 |
| 114 | 140 | 129 |
| 81 | 140 | 125 |

Because of the high crystalline content of the additive, mainly due to the high proportion of the short-chain polymer P2 which crystallises extremely well, the additive is hard and relatively brittle.

A high modulus of elasticity of the additive reflects the quality of the additive and is >100, preferably >200, more preferably >300 and most preferably >400 MPa. The brittleness, measured as the elongation at break in %, reflects the quality of the additive and is <100, preferably <60, more preferably <40, most preferably <20.

Additive Types:

TABLE 3

| Additive types | | Polymer to be processed |
|---|---|---|
| Polymer P1 | Polymer P2 | Polymer P0 |
| HDPE HMWPE UHMWPE LDPE LLDPE VLDPE PE-PP copolymer PE copolymers | PE wax | HDPE, HMWPE, LDPE, LLDPE, VLDPE, PP-PE and PE-PP copolymers, PE copolymers |
| Isotactic PP | Isotactic PP wax | Isotactic, syndiotactic or atactic PP |
| Syndiotactic PP | Syndiotactic PP wax | Syndiotactic, isotactic or atactic PP |
| Atactic PP | Atactic, syndiotactic or isotactic PP wax | Atactic, isotactic or syndiotactic PP |
| PP-PE copolymers | Isotactic or syndiotactic PP wax or PE wax | HDPE, HMWPE, LDPE, LLDPE, VLDPE, PP-PE copolymers, PE copolymers |
| PP copolymers | Isotactic or syndiotactic PP wax or copolymer wax | Isotactic, syndiotactic or atactic PP |
| PVA | PVA wax | PVA |
| PVC | PVC wax | PVC |
| PC | PC wax | PC |
| PA | PA wax | PA |
| PU | PU wax | PU |
| ABS | ABS, PS, acrylonitrile or butadiene wax | ABS |
| PS | PS wax | PS |

Table 3 shows a number of additive types for use with various polymers and polymer systems. The term wax in this case refers in each case to an appropriate short-chain, predominantly linear polymer or a highly branched, preferably spheroid polymer of a relatively low viscosity. The list is not to be taken as being restrictive, but is rather intended to explain by way of examples the principles as to which additives are permissible. The principles behind the combination of polymer P1 and P2 to form the additive have already been described as compatibility of P1 and P2, at least partial crystallisability of P1 and P2, MFI of P1 and MFI of the mixture of P1 and P2, viscosity of P2, difference in the crystallisation temperatures of P1 and P2, and difference in the melting temperature of the additive from P1. If these conditions are maintained then by using the additive in processing a polymer P0, a substantial acceleration of the process is possible. This is the primary purpose of the additive. Moreover, the final properties of the product produced in this way are modified in comparison with an analogous product obtained without additive. These modifications are unique to each combination of P1, P2 and P0 and also depend on the parameters for the processing of P0 plus additive to form the end product. The mechanisms playing a fundamental role here are as follows. The crystallisable polymer P2 gives the end product an equal or increased modulus of elasticity, an increased or equal yield point, and a somewhat reduced or equal elongation at break or toughness (this is true in principle, but the toughness can also be improved by the process optimised with the additive, i.e. because of the reduction in frozen-in stresses.) In addition, the polymer P1 of the additive also affects the properties of the end product. If for example P1 is an HDPE and P0 is an LDPE, then the modulus of elasticity and the yield point of the end product increase whilst the elongation at break decreases slightly, the LDPE being altered somewhat in the direction of an HDPE by P1 and P2. If this modification is desired, then the appropriate additive is used. If the final properties are to be altered less markedly in the direction specified, then the use of an additive with LDPE as P1 is indicated. If the final properties are to remain unaltered or even to be altered in the opposite direction, then an additive with LLDPE or VLDPE as P1 may be used. The effect on the final properties of P2 can be compensated or even reversed by a P1 of this type. If an additive of this type is used with LLDPE or VLDPE as P1, for example with an injection moulding HDPE as P0, then a considerable improvement in the toughness of the end product can be achieved, the modulus of elasticity and yield point remaining approximately the same because P1 and P2 cancel each other out in this respect. If an additive with HMWPE is used as P1 when processing an HDPE, then the modulus of elasticity, yield point and toughness may all increase. These examples demonstrate the mechanisms which may come into effect with various combinations of P1, P2 and P0. These mechanisms may be generalised from these examples and be applied to a specific situation by a person skilled in the art. Whereas conventional additives which are used as processing aids and process accelerators have an inferior effect in this respect and generally detract from the final properties, the additive according to the invention not only has great benefits due to the process acceleration, but also provides targeted and advantageous modification of the final properties due to the selection of the optimum additive in a specific case.

In principle, the additive may comprise further substances in addition to the polymers P1 and P2, such as further substances which also have a process-accelerating effect, so the principle behind the additive according to the invention can be combined with further similar effects. Just as the polymer P2 can easily be homogenised in a polymer melt by means of the additive, further process-accelerating substances can also easily be homogenised in a polymer melt using the additive. As regards the aforementioned process-accelerating substances, reference should here be made to the prior art; they are used in lower proportions than is conventional, so that the inherent drawbacks thereof do not arise but a contribution to the process acceleration can still be made. Specific examples include: lubricants such as fatty acids and the derivatives thereof, waxes, and coupling agents such as titanium and zirconium complexes, in particular monoalkyloxy titanates and zirconates.

It is particularly expedient for nucleating agents to be mixed into the additive according to the invention, as this allows the crystallisation to be accelerated. A wide selection of nucleating agents is disclosed in the prior art; the metering of the nucleating agent is selected in such a way that when 5% additive is used it contains sufficient nucleating agent to achieve the concentration recommended by the manufacturer in the end product. The addition of various additives which are used with polymers, for example heat and UV stabilisers, antioxidants, flame retardants, antistatics, antimicrobial additives and chain-extension catalysts, becomes particularly expedient if the additive according to the invention is used in the field of recycling.

For a list of the various lubricants, additives and nucleating agents, reference is made to the prior art, in particular to "Functional Additives for the Plastics Industry", P. Dufton, Rapra Industry Analysis Report Series, 1998, "Handbook for the chemical analysis of plastic and polymer additives", J. Hubball, Boca Raton, CRC Press 2008, "Plastics additives: advanced industrial analysis", J. C. J. Bart, IOS Press, 2006, "Atlas of plastics additives: analysis by spectrometric methods", D. O. Hummel, Springer 2002, and "Handbook of Polyolefins", C. Vasile, Marcel Dekker, 2000.

A further group of substances which may be added to the additive according to the invention are particulate substances which maintain the particulate form thereof even in the polymer melt, i.e. which are insoluble in polymer P1 and P2, such as talc, carbon black or pigments. These substances may simply be introduced into a polymer P0 along with the additive and dispersed; however, because they substantially reduce the viscosity, the proportion thereof based on P1 and P2 is <20, preferably <10, more preferably <5, most preferably <1% by weight. If process acceleration is the main aim, then substances of this type are completely omitted from the additive.

Advantages

The advantages of using the additive according to the invention in various processing processes for polymer melts result from the fact that the additive homogenises very well with the polymer melt, and so the short-chain polymer reduces the viscosity of the polymer melt (reduced internal friction) on the one hand and produces a lubricating effect on the surface (reduced external friction) on the other hand. This enables a considerable increase in productivity: higher throughputs, lower process times, reduced cycle times. A further optimisation results from the reduction in or elimination of build-ups at dies. Energy savings also result, because torques can be reduced by 10 to 30% and chamber temperatures by 10 to 40° C. However, a melt temperature reduced by 10 to 40° C. also allows gentle processing. Thus, thermally sensitive polymers can be processed more gently or thermally sensitive additives such as stabilising agents can be added in smaller amounts, and this results in further savings because additives of this type are generally expensive.

Burn marks which may arise during injection moulding are reduced or eliminated. A further advantageous application of the additive is in filled polymers. Fillers may for example be talc, minerals, fibres, carbon, wood etc. and these fillers each increase the viscosity, and this is detrimental to the processability of the polymers enriched with fillers. The use of the additive makes simpler and more rapid processing possible in this case, too, the wetting characteristics of the polymer melt which are improved by the additive also playing a role. Moreover, larger filling amounts are possible and thermally sensitive fillers such as wood and natural fibres can also be processed. Use of the additive in the recycling field is especially advantageous, in particular in the production of regrind. Because the polymers to be recycled are often relatively difficult to plasticise, i.e. have a higher melt viscosity than the native polymers, the additive according to the invention is especially advantageous in this field.

The additive may in principle be used advantageously for all plastics material processing processes, for example for injection moulding, blow moulding, rotomoulding, film blowing, calendering, working up, in particular when manufacturing polymer blends and master batches and when extruding films and profiles, increased productivity and/or a reduction in energy expenditure being achieved in each case. However, the extent of the advantage is dependent on the process and the devices. With 5% of the additive being used when processing a polymer P0, process acceleration of >3, preferably >5, more preferably 7, most preferably >10% in terms of throughput is generally achieved. A 10 to 30% increase in productivity is typical, better or worse results being achieved according to the individual case. The process acceleration is extremely good in the field of injection moulding, for which the process acceleration is typically in the range of 15 to 35% when 5% of the additive is used.

The final properties of the materials processed with the additive are not adversely affected, but actually slightly improved, as has been confirmed again and again in tests with different processes and products by numerous plastics materials processors. With higher proportions of the additive, the modulus of elasticity and the yield point are improved as a result of the increased crystallinity, whilst the toughness actually increases slightly, because lower mass temperatures and better flow characteristics result in fewer frozen-in stresses and deformations.

In practice, the additive is used in the form of a powder, pellets or granulate. If the polymer P0 to be processed is in powdered form, the additive is preferably used in powdered form, and if the polymer P0 to be processed is in the form of pellets or granulate, the additive is preferably used in the form of pellets or granulate, because comparable forms can more easily be mixed together homogeneously.

In practice, the additive is typically used in a proportion of 1 to 20%, preferably 1.5 to 15%, more preferably 2 to 12%.

Process

Any desired continuous or discontinuous mixing processes which have a distributive as well as a dispersive effect may be used to produce the additive.

Figure 2:
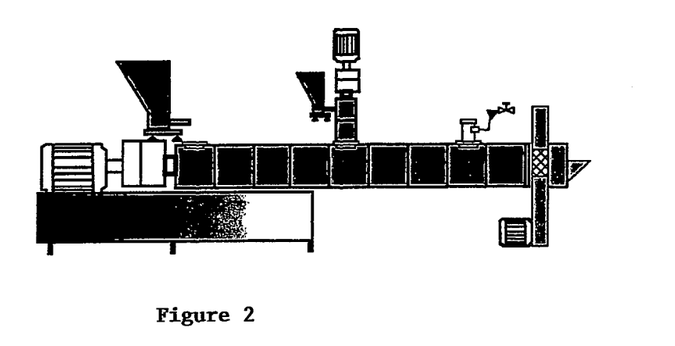
FIGS. 2 and 3 show systems that can be employed in embodiments of the invention.

It is advantageous to use extruders, in particular double-screw extruders. In this case, the long-chain polymer P1 is plasticised in the first part of the extruder, and after this the short-chain polymer P2 is introduced in the form of a powder or granulate and melts in contact with the hot melt of polymer P1 and under the influence of mechanical energy. Subsequently, homogenisation takes place in a mixing section with kneading blocks, followed by optional evacuation and extrusion through a die (FIG. 2).

Figure 3:
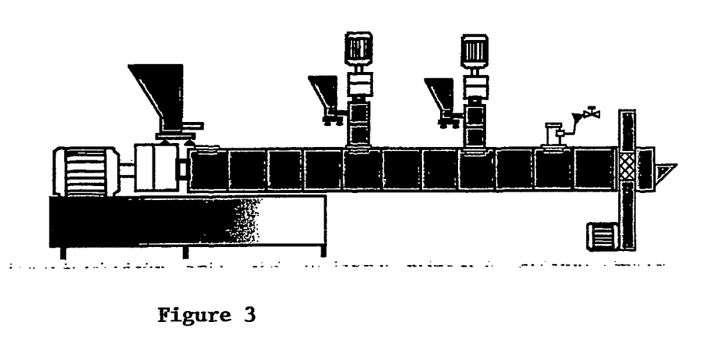

An alternative variant involves the polymer P1 being introduced into the extruder together with a proportion of polymer P2 and this mixture being plasticised and homogenised before further polymer P2 is introduced; this is particularly advantageous for very high proportions of polymer P2 and/or when using polymer P1 with a low MFI. Finally, cascaded feeding of polymer P2 is possible, P2 being fed to different portions of the extruder in a plurality of stages (FIG. 3).

EXAMPLES

Example 1

Using a counter-rotating, closely intermeshing Collin Extruders ZK 50/12D with 12L/D and D=50 mm, mixtures of P1=HDPE and P2=PE wax were produced, the PE wax being a short-chain PE with a molecular weight of approximately 1000 g/mol and having a viscosity of approximately 10 Pas at 150° C. The proportion of P2 was varied in the range of 40 to 65%. The throughput was 12 kg/h and the screw speed was 120 rpm. Chamber temperatures were 35/170/170/160/150° C. (die). Because this was a small extruder and a long mixing portion was available, the HDPE (in the form of a granulate) and the PE wax (in the form of a powder) could be introduced together, then melted down and fully mixed. The low-viscosity mixture was extruded as a strand and immediately cooled in a waterbath at approximately 35° C. then granulated. Thereupon, the additive obtained in this way was mixed in in various plastics materials processing processes and the effect thereof was tested. When using this mixture as an additive in an amount of 3 to 10% based on the polymer P0 to be processed, the cycle times could for example be reduced by up to 35% with the injection moulding method.

It was established that even greater reductions in the cycle time are inherently possible. In general, modern injection moulding machines allow a greater proportion of this potential to be realised, but it was found that when designing the machines the possibility of such extremely short cycle times had not been taken into account. Even the latest injection moulding machines are too slow to exploit the potential of the additive fully. Whereas it was previously the polymer to be processed that set the limits, with the use of the additive it is now the machines. This is a striking demonstration of the fact that the additive has broken new ground. When designing these machines, it was not contemplated that it might ever be possible to accelerate the processing of polymers in the way that the additive has made possible. Even if the potential of the additive cannot be exploited fully with current machines, even the accelerations which are possible with these machines are nevertheless considerable and of great economic benefit.

Example 2

A closely intermeshing, co-rotating double-screw extruder was used to mass-produce additive. This is an economically expedient machine for the working up of polymer mixtures. An HDPE was used as P1, and a PE wax with a DSC melting peak at 114° C. and a viscosity of approximately 10 Pas at 150° C. was used as P2. The proportion of P2 was 60% based on P1+P2.

The external screw diameter was 62 mm and the extruder had a length of 32L/D. The desired chamber temperatures were set as follows: neutral/200/200/200/180/200/180/160. After the extruder, a melt filter was installed followed by a sheet die with 17 holes at approximately 5 mm diameter. The extruded strands were cooled in a water bath at 35° C. Granulation was performed by the simple strand granulation method.

The screw configuration was selected as follows: a short feed zone with a conventional sequence of conveying elements of approximately 6L/D, followed by appropriate kneading blocks and return conveying elements up to 21L/D into the process, then a short feed zone, followed by a homogenisation portion via appropriate mixing elements. The screw was designed for discharging the melt from the process length 29L/D.

The extruder was configured in such a way that the greatest proportion of the energy input could be introduced into the product mechanically via the screw. This was the only way that commercially beneficial throughputs could be achieved.

Once it has melted, P2 has a very low viscosity and moreover exhibits a strong lubricating effect, and this substantially reduces the energy input via the screw. If HDPE and PE wax are introduced simultaneously, then the PE wax will melt first. When only a small proportion of the wax has melted, the extruder is hardly in a position to melt the HDPE mechanically. The HDPE can only still be melted using the chambers by simple thermal convection. This process is extremely inefficient because the possible throughputs are very low at approximately 25 kg/h.

By split-feeding, the HDPE could be melted in a first step by mechanical energy input and efficiently heated to above the melt temperature; cf. FIG. 2. Subsequently, the PE wax was added using a side feeder. The hot HDPE melt was cooled by the cold PE wax. On the one hand, the temperature of the PE melt must be high enough for the HDPE melt not to be frozen when cooled, and on the other hand, energy is introduced by convection in the further chambers. Furthermore, cooling the HDPE melt increases the viscosity thereof, and this again promotes the mechanical energy input. With this procedure, throughputs of up to 300 kg/h could be achieved, i.e. several times higher than could be achieved with the conventional procedure where the two components were introduced simultaneously.

The HDPE was introduced at a constant rate in the housing 1 by volumetric metering. The PE wax was initially introduced into a side feeder using a volumetric metering unit. The proportion of wax was 60% of the total throughput. The side feeder forced the PE wax into the extruder. The side feeder was cooled so that the wax could not melt while still in the side feeder, which would otherwise lose its conveying capacity. Thereafter the wax was melted and homogenised with the PE melt in the remaining length of the process. With split feeding, throughputs of up to 300 kg/h could be achieved with the described configuration. Without this procedure, the throughput was approximately 25 kg/h. The throughput achieved could certainly be increased even more by further optimisations.

Straight after the extruder, and still before the extrusion die, a melt filter unit was installed. In addition to the actual function of filtering out foreign substances, this had the advantage that the melt pressure could be increased and thus better homogenisation of the melt could be achieved, and this is particularly important at higher throughputs.

The strands left the die homogeneously and uniformly and could be drawn through the cold water very easily. The cooled strands were easy to granulate into pellets with a conventional commercial granulation unit. What is of importance is that the temperature of the strands before they are introduced into the granulator should not be too cold (the strand is then brittle) or too warm (the strand is too plastic and adhesive).

It was found that the strands sometimes contain air bubbles. For this reason, a further test with a degassing station was performed; see FIG. 2. The air bubbles could be eliminated even with a small negative pressure.

Example 3

With the split feeding method described in Example 2, with a suitable configuration, the heating chamber performance can be avoided as a limiting factor (Example 1). For this purpose, the energy input is produced primarily by the screw, and this means that either the mechanical energy input or the mixing potential becomes the limiting factor, ensuring a highly economical procedure. In the former case, the limitation can be shifted upwards by extending the HDPE melting region; in the latter case, the homogenisation region can be extended. Another option for improving the homogenisation performance is the cascade method, where the wax is introduced in two stages; see FIG. 3.

The invention claimed is:

1. A method for accelerating an injection moulding process of a polymer composition, the method comprising a step of mixing an additive into a polymer P0 to form the polymer composition, the additive is used in amount of 1 to 20% by weight of the polymer composition, the polymer P0 is selected from the group consisting of a homopolymer of polyethylene (PE), a homopolymer of polypropylene (PP), and a PP-PE copolymer consisting of PP and PE monomers, the method further comprising performing a shaping to form a molded body by injection moulding in which the polymer composition is used, wherein the additive is a premix based on a polymer mixture, the polymer mixture comprising:

at least one first polymer P1 having a weight average molecular weight Mw>20,000 g/mol, wherein the first polymer P1 comprises at least one block of at least 10 monomer units M1 each individually selected from the group consisting of ethylene and propylene, the first polymer P1 is selected from the group consisting of a homopolymer of PE, a homopolymer of PP, and a PE-PP copolymer consisting of PP and PE monomers, the MFI of the at least one first polymer P1 is 1-50 g per 10 min at 190° C. and at 2.16 kg, and at least one second polymer P2 having a viscosity of <200 mPas measured at a temperature of 10° C. above the melting point of the first polymer P1 and which comprises at least one block of at least 10 monomer units M1, the monomers M1 constituting the second polymer P2 are the same as the monomers M1 constituting the first polymer P1, the second polymer P2 selected from the group consisting of PE wax and PP wax, the difference in the crystallization temperatures of the polymer P1 and the polymer P2 is less than 15° C., these crystallization temperatures being measured as onset temperatures by DSC at a cooling rate of 20° C./min, wherein the ratio of the polymer P2 based on the polymer P1 and P2, in % by weight, is in the range >B and <F, wherein the value of B is 49 for an MFI of 1 g/10 min of the polymer P1, is 45 for an MFI of 10 g/10 min of the polymer P1, is 44 for an MFI of 20 g/10 min of the polymer P1, and is 43 for an MFI of 50 g/10 min of the polymer P1, and wherein the value B for an MFI of the polymer P1 not given is obtained from the above values by linear interpolation or extrapolation, wherein the value of F is 78 for an MFI of 1 g/10 min of the polymer P1, is 75 for an MFI of 10 g/10 min of the polymer P1, is 74 for an MFI of 20 g/10 min of the polymer P1, and is 73 for an MFI of 50 g/10 min of the polymer P1, and wherein the value F for an MFI of the polymer P1 not given is obtained from the above values by linear interpolation or extrapolation, the additive has a proportion of particulate components which are insoluble in the polymer mixture of 0% by weight or <20% by weight based on the polymers P1 and P2, the additive has an MFI of 8 to 200 g per 10 min and the melting point of the additive is less than or equal to 7° C. higher than the melting point of the polymer P1, and the polymer in the polymer composition consist of (i) the polymer P0, (ii) the at least one first polymer P1, and (iii) the at least one second polymer P2.

2. The method according to claim 1, wherein the second polymer P2 has a vapor pressure less than 30 mbar at 250° C.

3. The method according to claim 1, wherein the first polymer P1 has a number average molecular weight $M_n$>20,000 g/mol.

4. The method according to claim 1, wherein the first polymer P1 is a homopolymer of PE.

5. The method according to claim 4, wherein the homopolymer of PE is selected from the group consisting of: UHMWPE, HMWPE, HDPE, LDPE, LLDPE and VLDPE.

6. The method according to claim 1, wherein the second polymer P2 is a PE wax that is a homopolymer of PE.

7. The method according to claim 1, wherein the polymer P0 is selected from the group consisting of: a homopolymer of PE and a homopolymer of PP.

8. The method according to claim 1, wherein the additive is in a form selected from the group consisting of powder, pellets and granulate.

9. The method according to claim 1, wherein the polymer P0 and the second polymer P2 are compatible.

10. The method according to claim 9, wherein the polymer P0 and the first polymer P1 are miscible.

11. A method for processing thermally sensitive polymers, hydrolytically sensitive polymers or polymers with thermally sensitive additives, the method comprising a step of mixing an additive into a polymer P0 to form an additive-containing mixture, the additive is 1 to 20% by weight of the additive-containing mixture, the polymer is P0 selected from the group consisting of a homopolymer of polyethylene (PE), a homopolymer of polypropylene (PP), and a PP-PE copolymer consisting of PP and PE monomers, the method further comprising performing a shaping to form a molded body by injection moulding in which the additive-containing mixture is used, wherein the additive is a premix based on a polymer mixture, the polymer mixture comprising at least one first polymer P1 having a weight average molecular weight $M_w$>20,000 g/mol, wherein the first polymer P1 comprises at least one block of at least 10 monomer units M1 each individually selected from the group consisting of ethylene and propylene, the first polymer P1 is selected from the group consisting of a homopolymer of PE, a homopolymer of PP, and a PE-PP copolymer consisting of PP and PE monomers, the MFI of polymer P1 is 1-50 g per 10 min at 190° C. and at 2.16 kg, and at least one second polymer P2 having a viscosity of <200 mPas measured at a temperature of 10° C. above the melting point of the first polymer P1 and which comprises at least one block of at least 10 monomer units M1, the monomers M1 constituting the second polymer P2 are the same as the monomers M1 constituting the polymer P1, the second polymer P2 is selected from the group consisting of PE wax and PP wax, the difference in the crystallization temperatures of the polymer P1 and the polymer P2 is less than 15° C., these crystallization temperatures being measured as onset temperatures by DSC at a cooling rate of 20° C./min, wherein the ratio of the polymer P2 based on the polymers P1 and P2, in % by weight, is in the range >B and <F, wherein the value B is 49 for an MFI of 1 g/10 min of the polymer P1, is 45 for an MFI of 10 g/10 min of the polymer P1, is 44 for an MFI of 20 g/10 min of the polymer P1, and is 43 for an MFI of 50 g/10 min of the polymer P1, and wherein the value B for an MFI of the polymer P1 not given is obtained from the above values by linear interpolation or extrapolation, wherein the value of F is 78 for an MFI of 1 g/10 min of the polymer P1, is 75 for an MFI of 10 g/10 min of the polymer P1, is 74 for an MFI of 20 g/10 min of the polymer P1, and is 73 for an MFI of 50 g/10 min of the polymer P1, and wherein the value F for an MFI of the polymer P1 not given is obtained from the above values by linear interpolation or extrapolation, the additive has a proportion of particulate components which are insoluble in the polymer mixture of 0% by weight or <20% by weight based on the polymers P1 and P2, the additive has an MFI in the range of 8 to 200 g per 10 min and the melting point of the additive is less than or equal to 7° C. higher than the melting point of the polymer P1, and the polymers in the additive-containing mixture consist of (i) the polymer P0, (ii) the at least one first polymer P1, and (iii) the at least one second polymer P2.

12. The method according to claim 11, wherein the first polymer P1 has a number average molecular weight $M_n$>20,000 g/mol.

13. A method for accelerating an injection moulding process of a polymer composition, the method comprising a step of mixing an additive into a polymer P0 to form the polymer composition, the additive is used in amount of 1 to 20% by weight of the polymer composition, the polymer P0 is selected from the group consisting of a homopolymer of polyethylene (PE), a homopolymer of polypropylene (PP), and a PP-PE copolymer consisting of PP an PE monomers, the method further comprising performing a shaping to form a molded body by injection moulding in which the polymer composition is used, wherein the additive is a premix based on a polymer mixture, the polymer mixture consists essentially of:

at least one first polymer P1 having a weight average molecular weight $M_w$>20,000 g/mol, wherein the polymer P1 comprises at least one block of at least 10 monomer units M1 each individually selected from the group consisting of ethylene and propylene, the first polymer P1 selected from the group consisting of a homopolymer of PE, a homopolymer of PP, and a PE-PP copolymer consisting of PE and PP monomers, the MFI of the at least one first polymer P1 is 1-50 g per 10 min at 190° C. and at 2.16 kg, and at least one second polymer P2 having a viscosity of <200 mPas measured at a temperature of 10° C. above the melting point of the first polymer P1 and which comprises at least one block of at least 10 monomers units M1, the monomers M1 constituting the second polymer P2 are the same as the monomers M1 constituting the first polymer P1, the at least one second polymer P2 selected from the group consisting of PE wax and PP wax, the difference in the crystallization temperature of the polymer P1 and the polymer P2 is less than 15° C., these crystallization temperatures being measured as onset temperatures by DSC at a cooling rate of 20° C./min, wherein the ration of the polymer P2 based on the polymer P1 and P2, in % by weight, is in the range >B and <F, wherein the value of B is 49 for an MFI of 1 g/10 min of the polymer P1, is 45 for an MFI of 10 g/10 min of the polymer P1, is 44 for an MFI of 20 g/10 min of the polymer P1, and is 43 for an MFI of 50 g/10 min of the polymer P1, and wherein the value B for an MFI of the polymer P1 not given is obtained from the above values by linear interpolation or extrapolation, wherein the value of F is 78 for an MFI of 1 g/10 min of the polymer P1, is 75 for an MFI of 10 g/10 min of the polymer P1, is 74 for an MFI of 20 g/10 min of the polymer P1, and is 73 for an MFI of 50 g/10 min of the polymer P1, and wherein the value F for an MFI of the polymer P1 not given is obtained from the above values by linear interpolation or extrapolation, the additive has a proportion of particulate components which are insoluble in the polymer mixture of 0% by weight or <20% by weight based on the polymers P1 and P2, the additive has an MFI in the range of 8 to 200 g per 10 min and the melting point of the additive is less than or equal to 7° C. higher than the melting point of the polymer P1, and the polymers in the polymer composition consist of (i) the polymer P0, (ii) the at least one first polymer P1, and (iii) the at least one second polymer P2.

14. The method according to claim 13, wherein the polymer P0 is selected from the group consisting of a homopolymer of PE and a homopolymer of PP.

15. The method according to claim 13, wherein the first polymer P1 is a homopolymer of PE.

16. The method according to claim 15, wherein the homopolymer of PE is selected from the group consisting of: UHMWPE, HMWPE, HDPE, LDPE, LLDPE and VLDPE.

17. The method according to claim 13, wherein the second polymer P2 is a PE wax that is a homopolymer of PE.

18. The method according to claim 13, wherein the additive is in a form selected from the group consisting of powder, pellets and granulate.

* * * * *